(12) United States Patent
Noiri

(10) Patent No.: US 6,734,943 B2
(45) Date of Patent: May 11, 2004

(54) LIQUID CRYSTAL DISPLAY PANEL WITH SEALING MEMBER ON SECOND PARTITION WALL AND MANUFACTURING METHOD THEREOF

(75) Inventor: Yoshikazu Noiri, Kagoshima (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/338,829

(22) Filed: Jan. 9, 2003

(65) Prior Publication Data

US 2003/0128327 A1 Jul. 10, 2003

(30) Foreign Application Priority Data

Jan. 10, 2002 (JP) ......................... 2002-003920

(51) Int. Cl.[7] .................. G02F 1/1339; G02F 1/1341
(52) U.S. Cl. .................. 349/153; 349/156; 349/157; 349/189; 349/190
(58) Field of Search ................. 349/153, 154, 349/156, 157, 160, 189, 190

(56) References Cited

U.S. PATENT DOCUMENTS

| | | | | |
|---|---|---|---|---|
| 5,459,598 A | * | 10/1995 | Carrington | 349/156 |
| 6,137,559 A | * | 10/2000 | Tanaka et al. | 349/153 |
| 6,219,126 B1 | * | 4/2001 | Von Gutfeld | 349/153 |
| 6,222,603 B1 | * | 4/2001 | Sakai et al. | 349/153 |
| 6,542,215 B2 | * | 4/2003 | Lee et al. | 349/153 |
| 6,552,769 B2 | * | 4/2003 | Cho et al. | 349/153 |
| 2002/0047980 A1 | * | 4/2002 | Jun et al. | 349/158 |

* cited by examiner

Primary Examiner—Tarifur R. Chowdhury
Assistant Examiner—Andrew Schechter
(74) Attorney, Agent, or Firm—McGinn & Gibb, PLLC

(57) ABSTRACT

In a LCD panel comprising a rear substrate, a front substrate, a liquid crystal material and a spacer for making the two substrates apart a specific distance from one another, a partition wall having at least one outlet unevenly disposed on the rear substrate is provided on the periphery of a display region of the rear substrate and another partition wall that surrounds the partition wall is provided on the periphery of the display region of the front substrate. Furthermore, a sealing material for sealing the liquid crystal material within the display region is provided at a tip end of the partition wall and an alignment layer for aligning molecules of the liquid crystal material in a predetermined direction is disposed on the display region of each of the rear substrate and the front substrate. Moreover, after the liquid crystal material has been dropped onto the display region of the rear substrate provided with the partition wall, the rear substrate and the front substrate are bonded to each other while a fraction of the liquid crystal material beyond a predetermined amount of liquid crystal material is discharged from the liquid crystal outlet. The sealing material is hardened while the rear substrate and the front substrate are entirely pressurized.

7 Claims, 16 Drawing Sheets

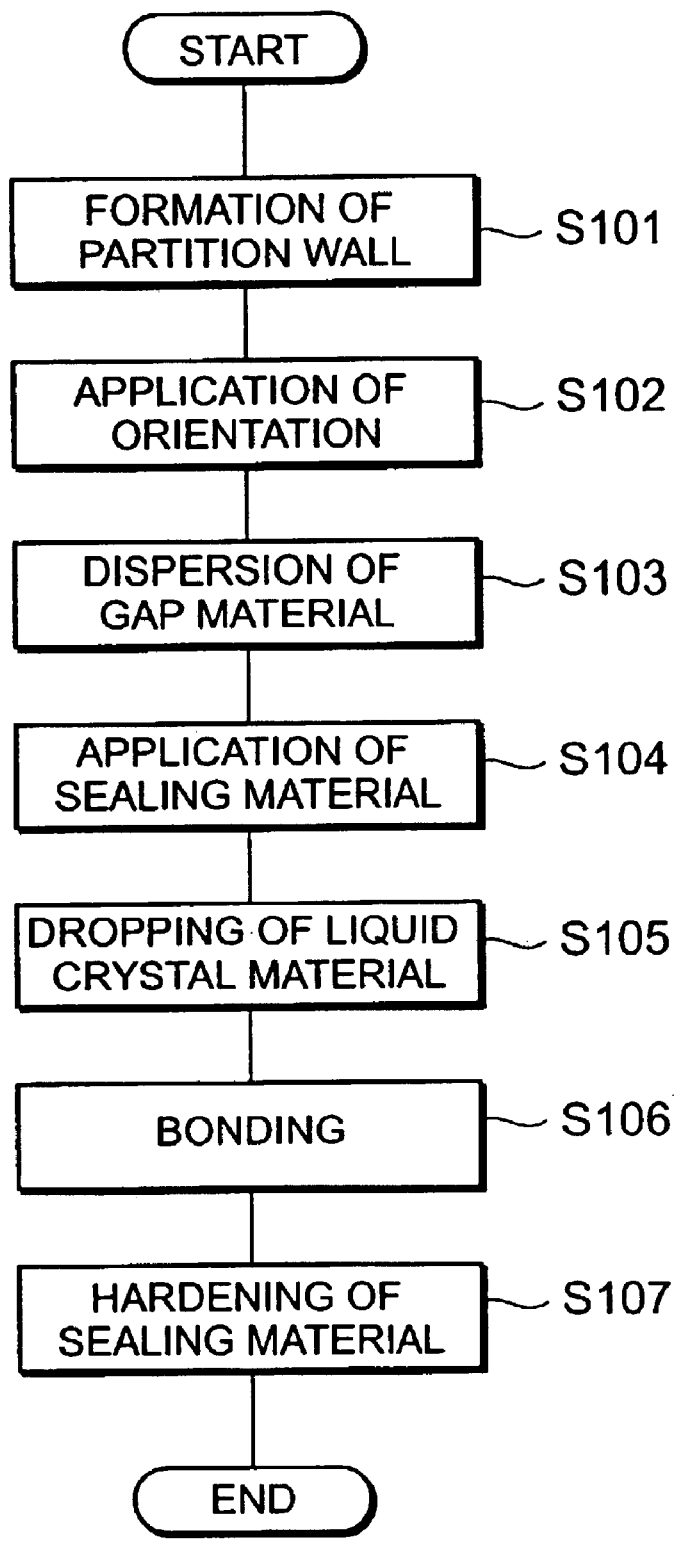

LIQUID CRYSTAL DISPLAY PANEL WITH SEALING MEMBER ON SECOND PARTITION WALL AND MANUFACTURING METHOD THEREOF

BACKGROUND OF THE INVENTION

1. Field of the Invention

The present invention relates to a liquid crystal display (LCD) panel and a manufacturing method thereof, and more particularly, to sealing structures suited for a process of liquid crystal dispenser method.

2. Description of the Related Art

A typical liquid crystal display (LCD) panel has a front substrate and a rear substrate with a liquid crystal interposed therebetween. More specifically, the front substrate is provided with a common electrode and a color filter, while the rear substrate is provided with an array of pixel electrodes connected to switching elements such as thin film transistors (TFTs).

FIG. 1 shows a first structural example of a liquid crystal display (LCD) panel according to the prior art. The LCD panel includes a rear substrate 101 with an array of pixel electrodes 11, a front substrate 201 with a color filter 12, a pair of alignment layers 4, a liquid crystal material 5, a spacer 6, and a sealing material 7.

The rear substrate 101 is a glass substrate provided with transparent pixel electrodes and an alignment layer 4. The front substrate 201 is a glass substrate provided with color filters 12 (R,G,B) and an alignment layer 4. The alignment layers 4 are provided for aligning molecules of the liquid crystal material 5 in a predetermined direction when an electric field is not applied to the molecules of the liquid crystal material 5.

The liquid crystal material 5 can be modulated by applying an electric field thereto when the driving voltage is applied between the pixel electrodes and a common electrode (not shown). The spacer 6 is arranged for keeping a cell gap between the rear substrate 101 and the front substrate 201 at a predetermined distance. The sealing material 7 is a material for sealing the liquid crystal material 5 within a display region (in this case, the display region is defined as a region covering all the pixel electrodes).

FIG. 2A is a plan view showing a bonding surface of the rear substrate at which surface the rear substrate and the front substrate, those substrates constituting the LCD panel of the first structure in the prior art, are bonded to each other. FIG. 2B is a cross-sectional view taken along a line X–X' shown in FIG. 2A. Furthermore, FIG. 3A is a plan view showing a bonding surface of the front substrate at which surface the rear substrate and the front substrate, those substrates constituting the LCD panel of the first structure in the prior art, are bonded to each other. FIG. 3B is a cross-sectional view taken along a line X–X' shown in FIG. 3A.

As shown in FIGS. 2A, 2B and FIGS. 3A, 3B, the LCD panel is formed in the following order.

(1) On the rear substrate 101, the array of pixel electrodes 11 and the alignment layer 4 are formed to provide a display region, and the sealing material 7 is provided on the outer circumference of the display region. Then, the liquid crystal material 5 is dropped on the alignment layer 4.

(2) In the front substrate 201, the color filter and the alignment layer 4 are formed to provide the display region, and the spacers 6 are distributed over the alignment layer 4.

(3) The rear substrate 101 and the front substrate 201 are overlapped with each other in a vacuum room, and then, the sealing material 7 is cured.

Note that in some cases, the sealing material 7 may be provided on the front substrate 201.

Furthermore, FIG. 4 shows a second structural example of the LCD panel in accordance with the prior art. The LCD panel includes the rear substrate 101, the front substrate 201, the alignment layer 4, the liquid crystal material 5, the spacer 6, the sealing material 7, and a sealant 8. The sealant 8 is a material for sealing an outlet 3 for surplus liquid crystal as shown in FIG. 5A, and is realized by employing UV-curing resin or the like.

FIG. 5A is a plan view showing a bonding surface of the rear substrate at which surface the rear substrate and the front substrate, those substrates constituting the LCD panel of the second structure in the prior art, are bonded to each other. FIG. 5B is a cross-sectional view taken along a line X–X' of FIG. 5A. Furthermore, FIG. 6A is a plan view showing a bonding surface of the front substrate at which surface the rear substrate and the front substrate, those substrates constituting the LCD panel of the second structure in the prior art, are bonded to each other. FIG. 6B is a cross-sectional view taken along a line X–X' of FIG. 6A.

As shown in FIGS. 5A, 5B and FIGS. 6A, 6B, and FIG. 7, the LCD panel is formed in accordance with the following procedure.

(1) In the rear substrate 101, the sealing material 7 is applied to the outer circumference of the display region such that the liquid crystal outlet 3 is formed, the alignment layer 4 is arranged in the display region, and the liquid crystal material 5 is dropped in the inside thereof.

(2) In the front substrate 201, the alignment layer 4 is arranged in the display region, and the spacer 6 is dispersed.

(3) The rear substrate 101 and the front substrate 201 are bonded to each other while being pressurized in the atmosphere, the excess liquid crystal material 5 is discharged from the liquid crystal outlet 3, and the sealing material 7 is hardened.

(4) A sealing operation is performed by applying the sealant 8 made of UV-curing resin or the like to the liquid crystal outlet 3 and hardening the sealant 8.

In the second structure, both the substrates can be bonded to each other in the atmosphere. Note that the sealing material 7 is applied to the front substrate 201 in some cases.

The LCD panel according to the prior art is formed in accordance with the above first or second structural example.

However, in the above LCD panel of the first structure according to the prior art, decompression (vacuuming) needs to be conducted in order to bond the rear substrate 101 and the front substrate 201 in a vacuum, and this operation is time-consuming. Furthermore, the liquid crystal material 5 dropped on the rear substrate 101 is not discharged but sandwiched by both the substrates in the structure, and thus, precision in the drop amount of the liquid crystal is required.

Furthermore, in the above LCD panel of the second structure according to the prior art, the operation for sealing the liquid crystal outlet 3 needs to be conducted.

Moreover, as to the LCD panel according to the prior art, both the first and second structures make the sealing material 7 thereof directly contact the liquid crystal material 5, and thus, deterioration and contamination of the liquid crystal material 5 occur owing to the sealing material 7. Furthermore, since the rear substrate 101 and the front substrate 201 are bonded to each other by the sealing material 7, the amount of the sealing material for the height corresponding to the diameter of the spacer 6 is required, which disadvantageously makes the amount of the sealing material 7 to be consumed large.

That is, there have been the following problems of the LCD panel according to the prior art.

(1) The decompression process makes the whole manufacturing process long in the manufacture of the LCD panel because decompression is time-consuming.

(2) Since high precision in the drop amount of the liquid crystal is required, the process of dropping the liquid crystal is long in the manufacture of the LCD panel.

(3) The sealing process needs to be performed.

(4) The usage amount of the sealing material is large.

(5) Since the liquid crystal material and the sealing material contact each other, the liquid crystal material is contaminated/deteriorated.

SUMMARY OF THE INVENTION

The present invention has been conceived in view of the above-mentioned problems, and therefore has an object to provide a LCD panel which can be formed without necessity for a sealing operation in the atmospheric pressure and with less amount of a sealing material, and to provide a manufacturing method thereof.

In order to achieve the above object, the present invention provides the following LCD panel as a first aspect. That is, the LCD panel includes: a liquid crystal layer sandwiched between a first substrate and a second substrate, a first partition wall on the first substrate, a second partition wall on the second substrate and a sealing member on the second partition wall. In more detail, the first partition wall is formed on the first substrate for defining a display region by surrounding the liquid crystal layer and provided with at least one opening to allow an overflow of an excess liquid crystal, and the second partition wall is formed lower than the first partition wall on the second substrate so as to surround the first partition wall and form a gap between the first substrate and the second partition wall partition wall, and further, a sealing member is provided on the second partition wall so as to seal the gap between the first substrate and the second partition wall.

According to the first aspect of the present invention, since the sealing material is disposed only on the tip end of the second partition wall, and is used in order to fill a fraction of the gap in the outer circumference between the first substrate and the second substrate, the amount of the sealing material to be consumed can be reduced.

Additionally, in order to achieve the above object, the present invention provides the following method for manufacturing a LCD panel as a second aspect. That is, the method for manufacturing a liquid crystal display panel, includes forming a first partition wall on a first substrate for defining a display region, the first partition wall being provided with at least one opening, and forming a second partition wall on a second substrate so as to surround the first partition wall, the second partition wall being lower than the first partition wall to form a gap between the first substrate and the second partition wall partition wall. The method further includes providing a sealing member on the second partition wall so as to seal the gap between the first substrate and the second partition wall, dropping liquid crystal onto a portion of the display region of the first substrate within the first partition wall, the portion being remote from the at least one opening of the first partition wall, bonding the first substrate and the second substrate while discharging a surplus liquid crystal from the at least one opening, and hardening the sealing material while pressurizing over the first substrate and the second substrate.

According to the second aspect of the present invention which is characterized as above, the bonding is conducted while the liquid crystal is discharged from the at least one opening as a liquid crystal outlet, whereby there is no need to enhance precision in the amount of the liquid crystal to be dropped to fill up the space enclosed by the first substrate, the second substrate, and the first partition wall.

Furthermore, since the liquid crystal can be diffused over the display region by utilizing surface tension, decompression does not need to be performed. Moreover, the liquid crystal outlet can be sealed by the second partition wall the moment the bonding of the rear substrate and the front substrate is completed. Thus, a sealing operation does not need to be performed.

In the above first and second aspects of the present invention, when the at least one opening constitutes a plurality of openings, it is preferable to provide at least one of the plurality of openings in the vicinity of a corner of the display region of the first substrate. Thus, the air does not remain at the corner portion of the display region.

Furthermore, it is preferable to have the first and second partition walls formed by a photoetching method. Thus, the first and second partition walls can be easily formed with a uniform height.

BRIEF DESCRIPTION OF THE DRAWINGS

FIG. 9 is a flowchart showing a procedure of forming the LCD panel in accordance with the first embodiment;

DETAILED DESCRIPTION OF THE
PREFERRED EMBODIMENTS

First Embodiment

Figure 1:
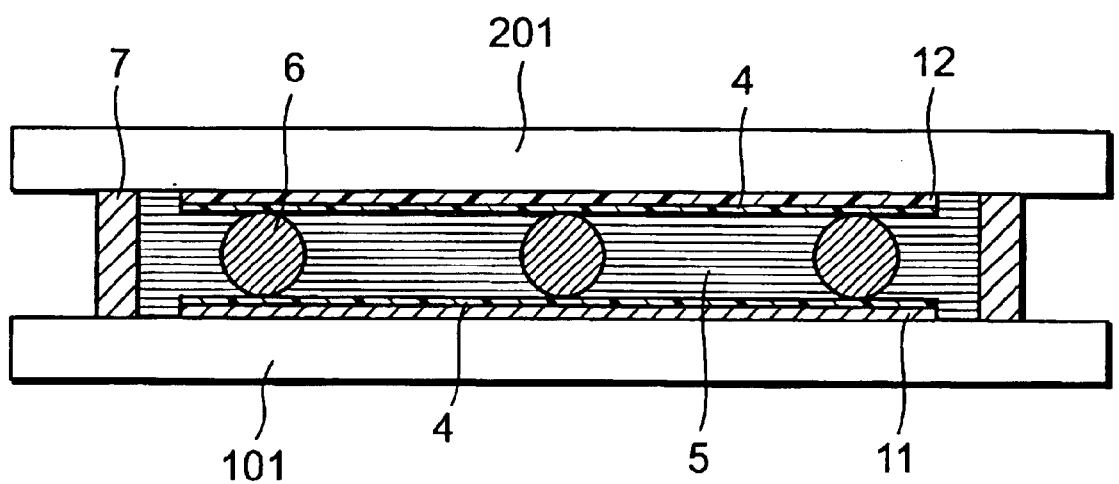
FIG. 1 is a cross-sectional view showing a LCD panel of a first structure according to the prior art.
Figure 2A:
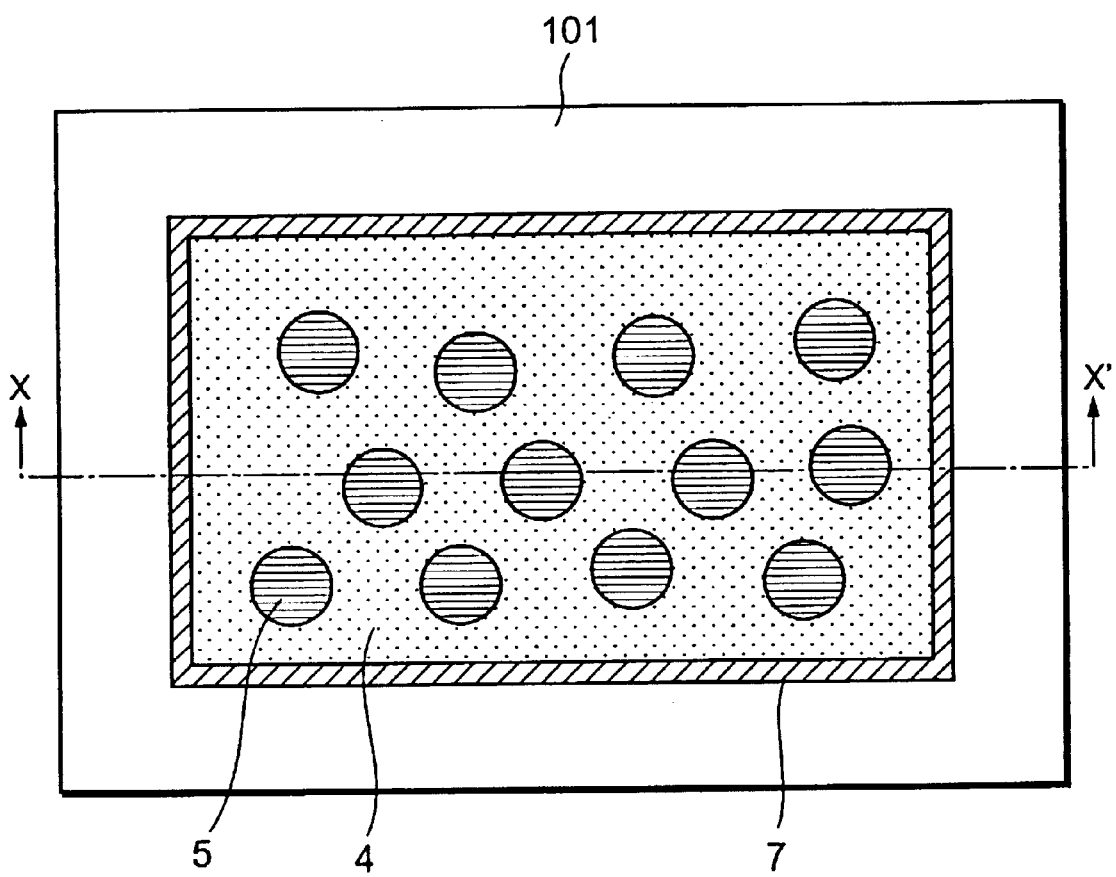
FIG. 2A is a plan view showing a bonding surface of the rear substrate at which surface the rear substrate and the front substrate, those substrates constituting the LCD panel of the first structure in the prior art, are bonded to each other.
Figure 2B:
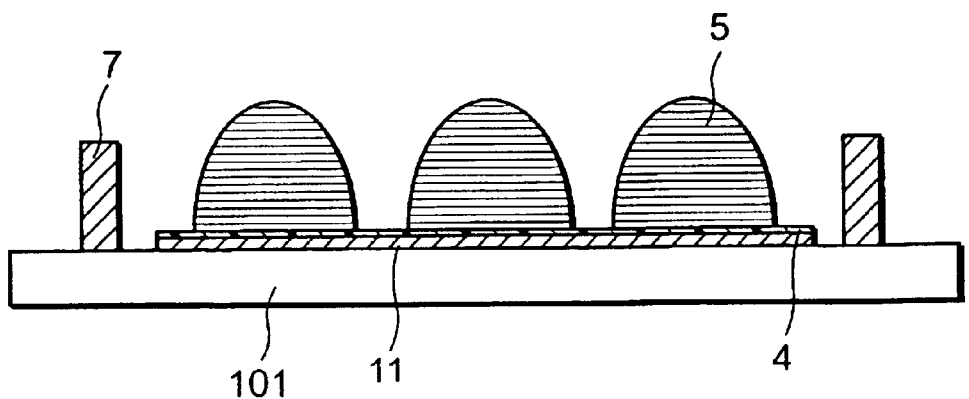
FIG. 2B is a cross-sectional view taken along a line X–X' of FIG. 2A.
Figure 3A:
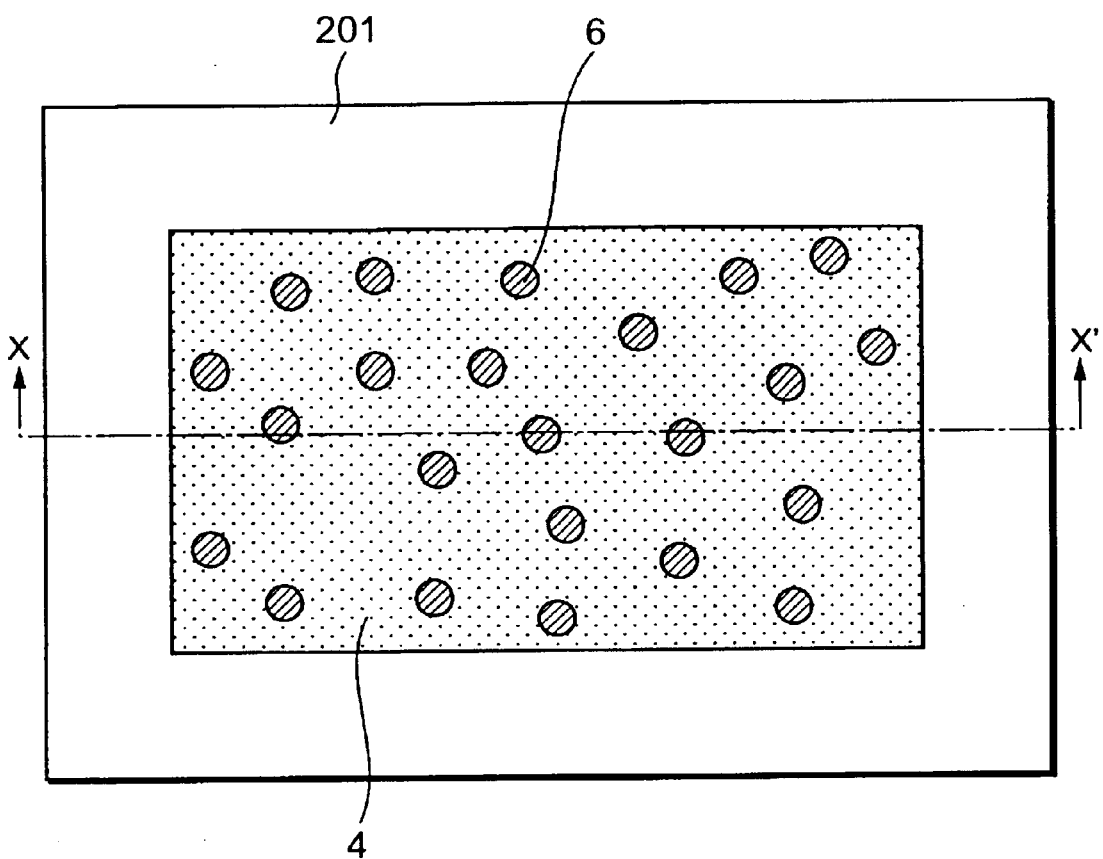
FIG. 3A is a plan view showing a bonding surface of the front substrate at which surface the rear substrate and the front substrate, those substrates constituting the LCD panel of the first structure in the prior art, are bonded to each other.
Figure 3B:
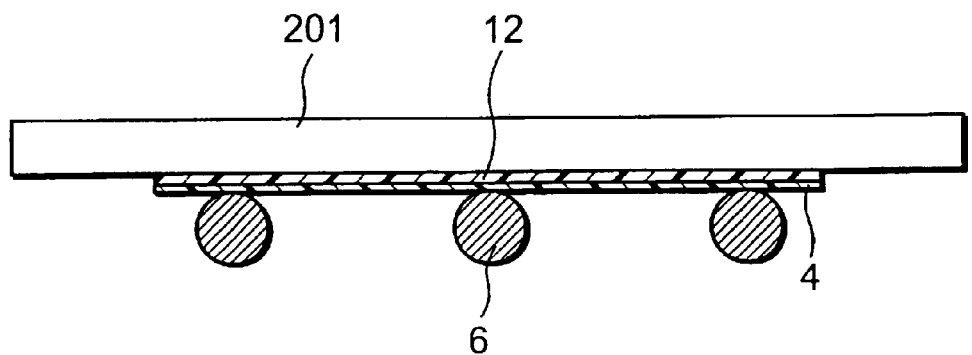
FIG. 3B is a cross-sectional view taken along a line X–X' of FIG. 3A.
Figure 4:
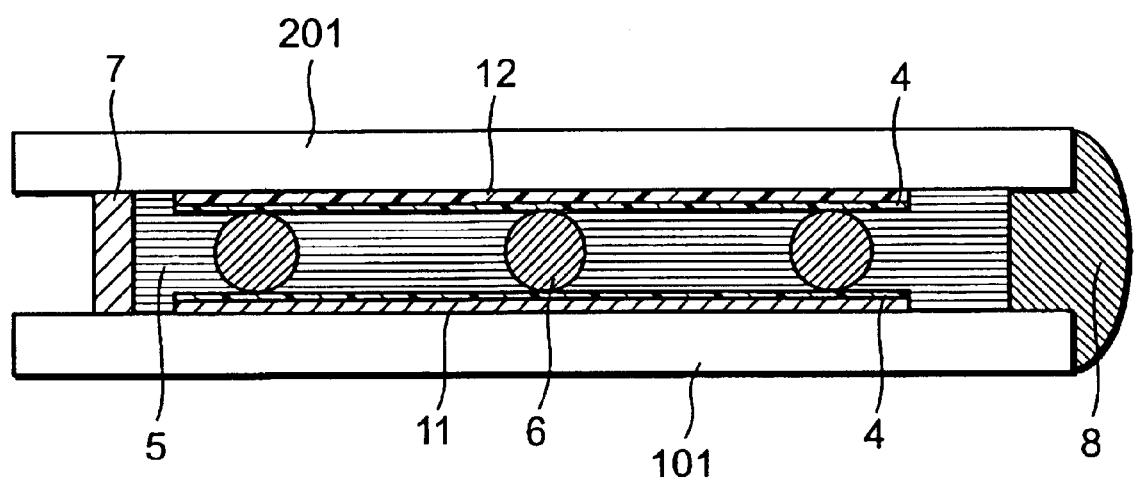
FIG. 4 is a cross-sectional view showing a LCD panel of a second structure according to the prior art.
Figure 5A:
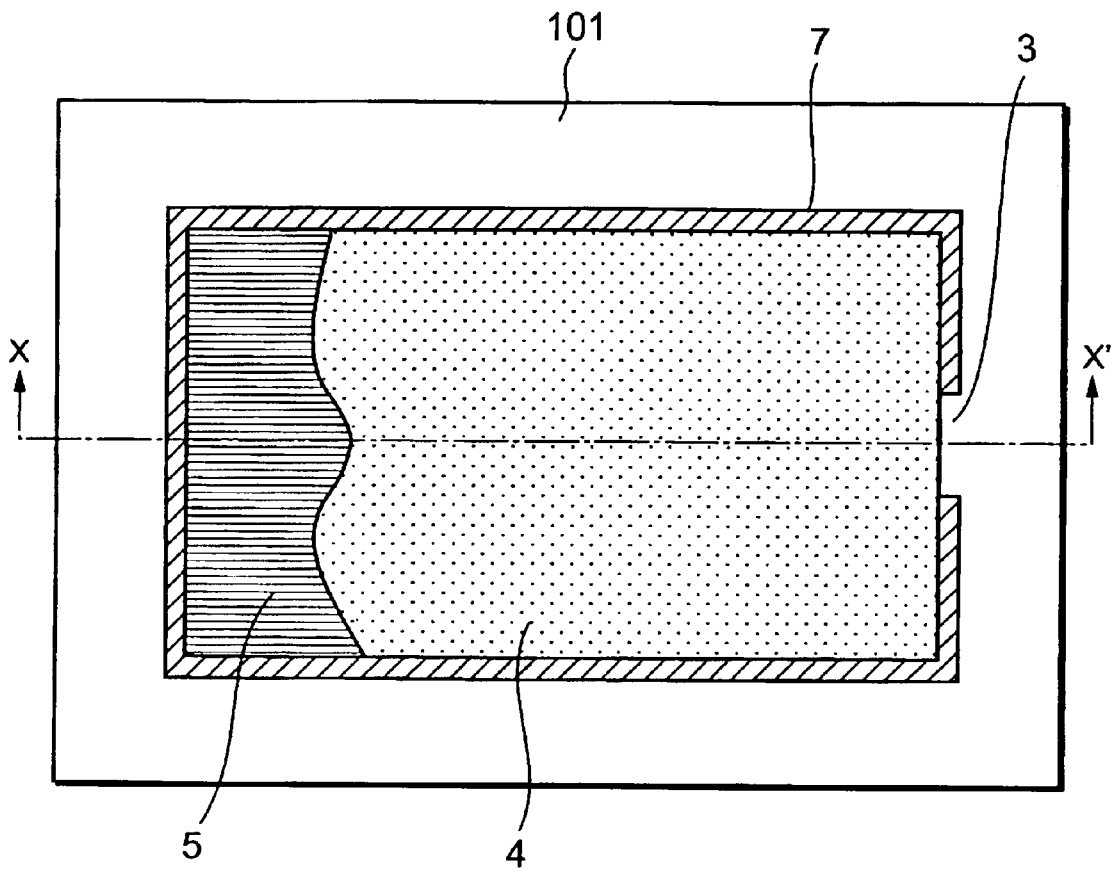
FIG. 5A is a plan view showing a bonding surface of the rear substrate at which surface the rear substrate and the front substrate, those substrates constituting the LCD panel of the second structure in the prior art, are bonded to each other.
Figure 5B:
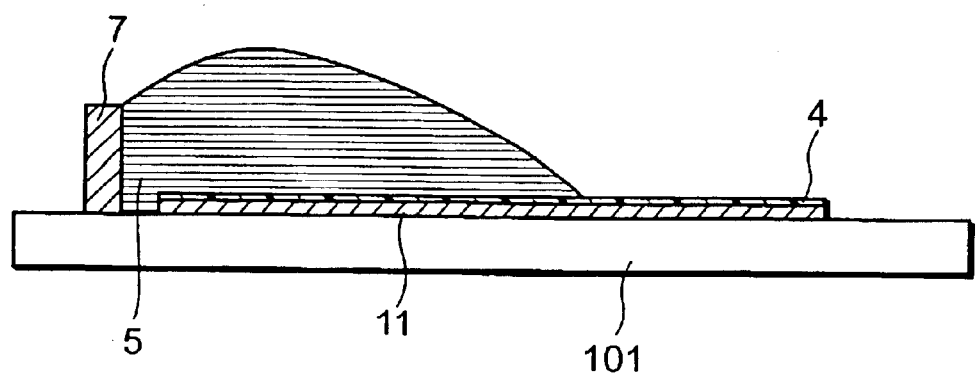
FIG. 5B is a cross-sectional view taken along a line X–X' of FIG. 5A.
Figure 6A:
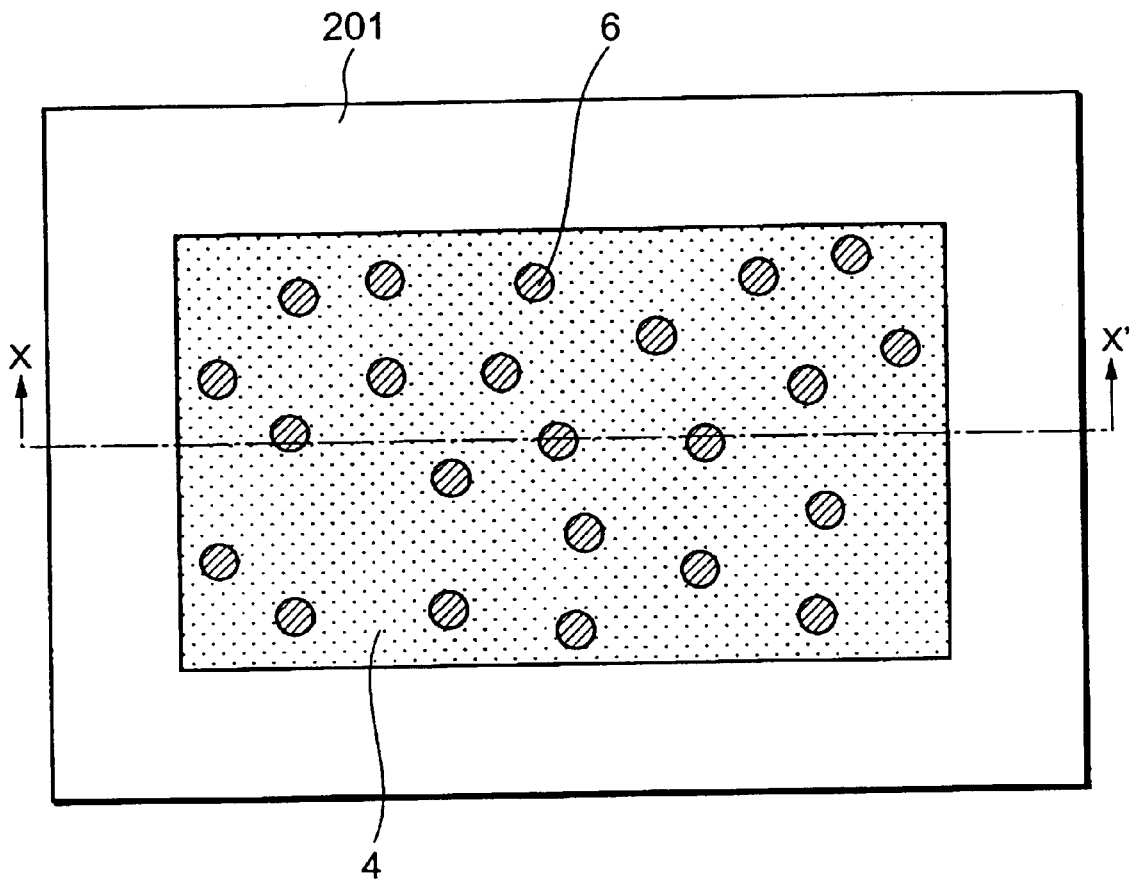
FIG. 6A is a plan view showing a bonding surface of the front substrate at which surface the rear substrate and the front substrate, those substrates constituting the LCD panel of the second structure in the prior art, are bonded to each other.
Figure 6B:
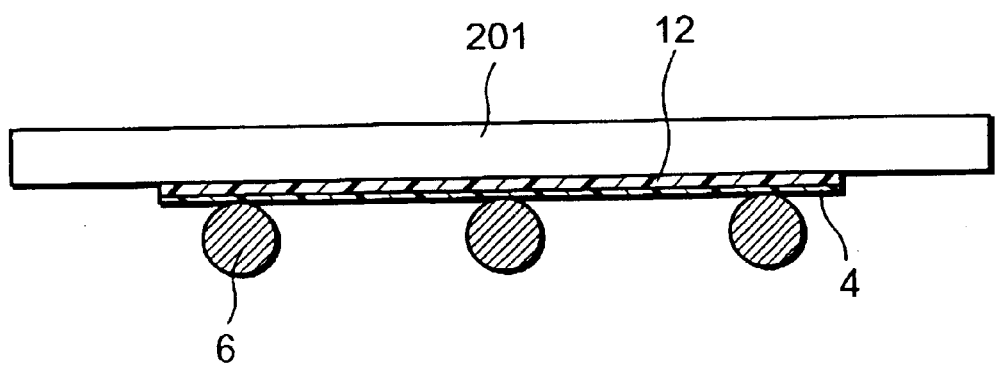
FIG. 6B is a cross-sectional view taken along a line X–X' of FIG. 6A.
Figure 7:
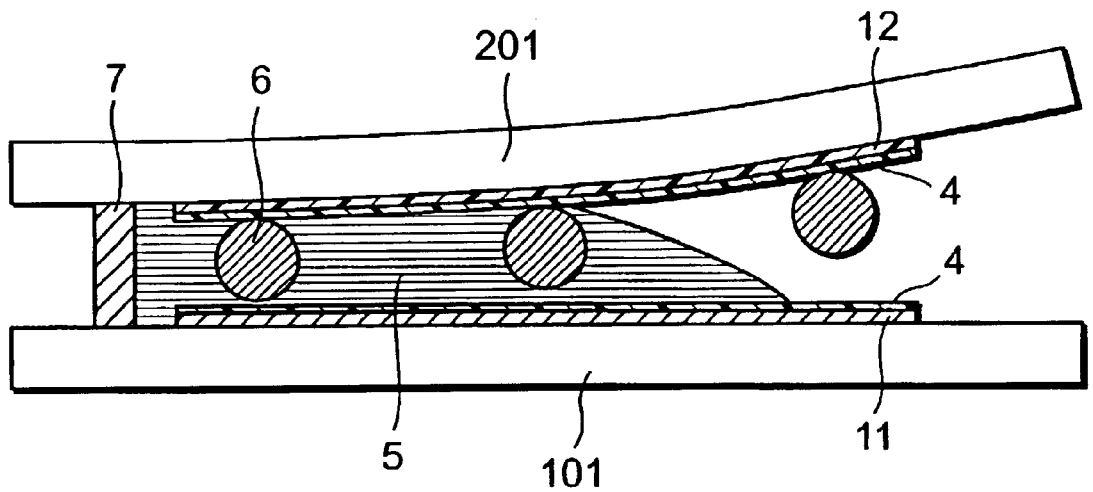
FIG. 7 is a diagram showing how the rear substrate and the front substrate are bonded to each other in accordance with the second structure in the prior art.
Figure 8:
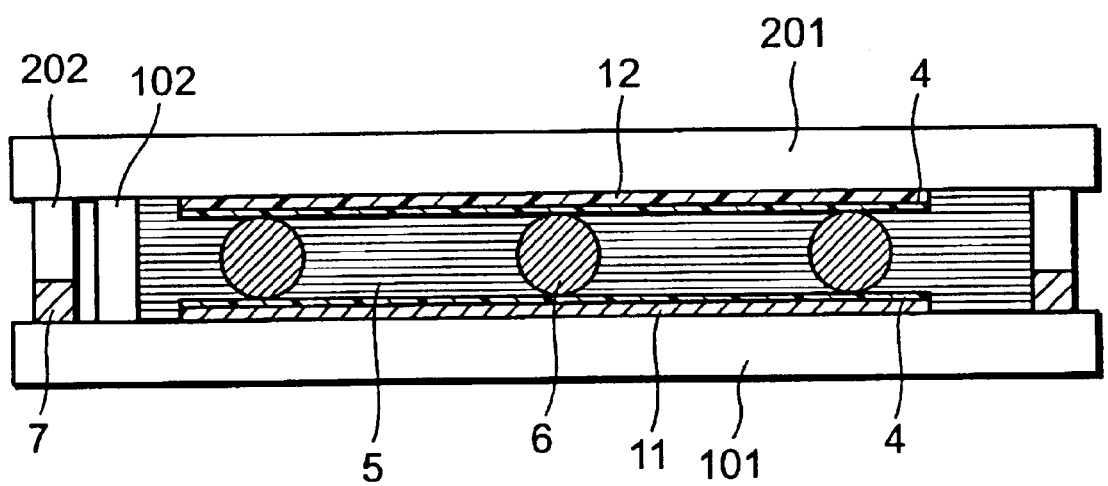
FIG. 8 is a cross-sectional view showing a structure of a LCD panel in accordance with a first embodiment of the present invention.

Referring to FIG. 8, a first embodiment of the present invention will be described. The LCD panel of this embodiment has a rear substrate 101 with an array of pixel electrodes 11, a front substrate 201 with a color filter 12, partition walls 102 and 202, a pair of alignment layers 4, a liquid crystal material 5, a spacer 6, and a sealing material 7.

The rear substrate 101 is a glass substrate provided with transparent electrodes 11 and an alignment layer 4. The front substrate 201 is a glass substrate provided with color filters 12 (R, G, B) and an alignment layer 4. The partition walls 102 and 202 are formed around a display region by exposure and development of a photosensitive resin film. That is, the partition walls 102 and 202 are preferably formed by a photoetching method. Note that photosensitive negative acrylic resin is preferably used as the photosensitive resin film. The alignment layer 4 is a film for aligning molecules of the liquid crystal material 5 in a predetermined direction when an electric field is not applied to the molecules. The liquid crystal material 5 is a liquid having a crystalline structure, and is aligned in the predetermined direction by the alignment layer 4 when an electric field is not applied to the molecules but is aligned along an electric field direction when an electric field is applied thereto by the transparent electrodes. The spacer 6 is a member for keeping a cell gap between the rear substrate 101 and the front substrate 201 at a predetermined distance. The sealing material 7 is a member for sealing the liquid crystal material 5 in the display region and preventing the liquid crystal material 5 from flowing to the outside.

The cell space between the rear substrate 101 and the front substrate 201 is filled with the liquid crystal material 5, and the cell gap between both the substrates is kept constant by the spacer 6. The partition wall 102 provided on the rear substrate 101 and the partition wall 202 provided on the front substrate 201 surround the display region of the LCD panel, and the gap between the partition wall 202 and the rear substrate 101 is sealed by the sealing material 7. The liquid crystal material 5 is sealed mainly in the display region by the partition wall 102. The partition wall 202 is arranged such that the liquid crystal material 5 does not leak to the outside thereof.

FIG. 9 shows a procedure of forming the LCD panel in accordance with this embodiment. The procedure is explained with reference to FIGS. 10A and 10B, FIGS. 11A and 11B, and FIG. 12.

Figure 10A:
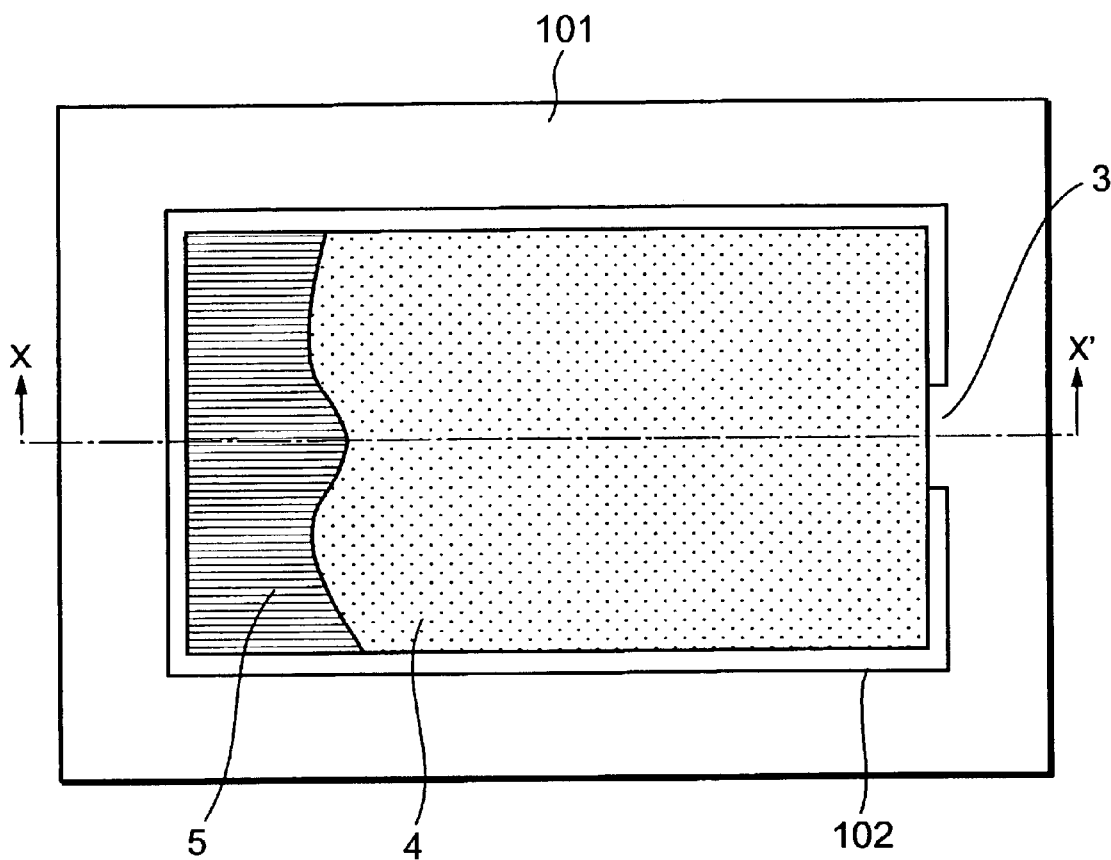
FIG. 10A is a plan view showing a bonding surface of the front substrate at which surface the rear substrate and the front substrate, those substrates constituting the LCD panel of the first embodiment, are bonded to each other.
Figure 10B:
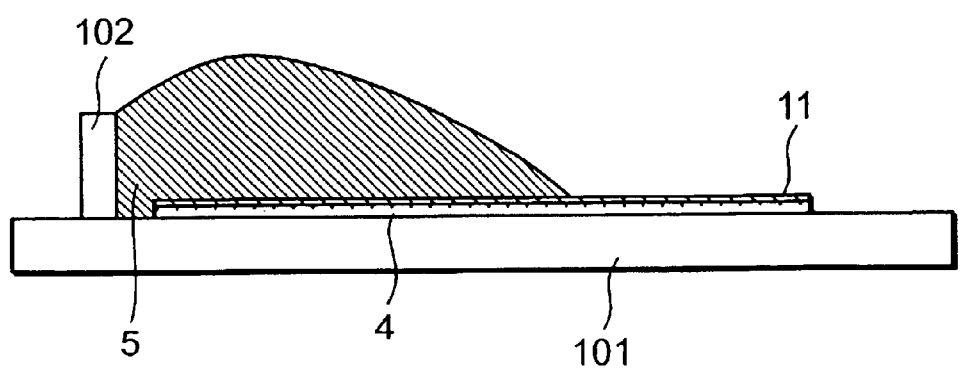
FIG. 10B is a cross-sectional view taken along a line X–X' of FIG. 10A.

The frame-shaped partition wall 102 is formed on the rear substrate, which has the transparent pixel electrode 11 formed thereon, so as to surround the display region and is provided with an outlet 3. The liquid crystal outlet 3 is arranged on one side of the rear substrate 101 (for example, on the right half side as shown in FIGS. 10A and 10B). On the other hand, the partition wall 202, which has an outer circumference larger than that of the partition wall 102 on the rear substrate 101, is formed on the front substrate 201 which has the color filter 12 formed thereon (step S101). Subsequently, the alignment layers 4 are formed on the display region of the rear substrate 101 and the front substrate 201, respectively (step S102).

Figure 11A:
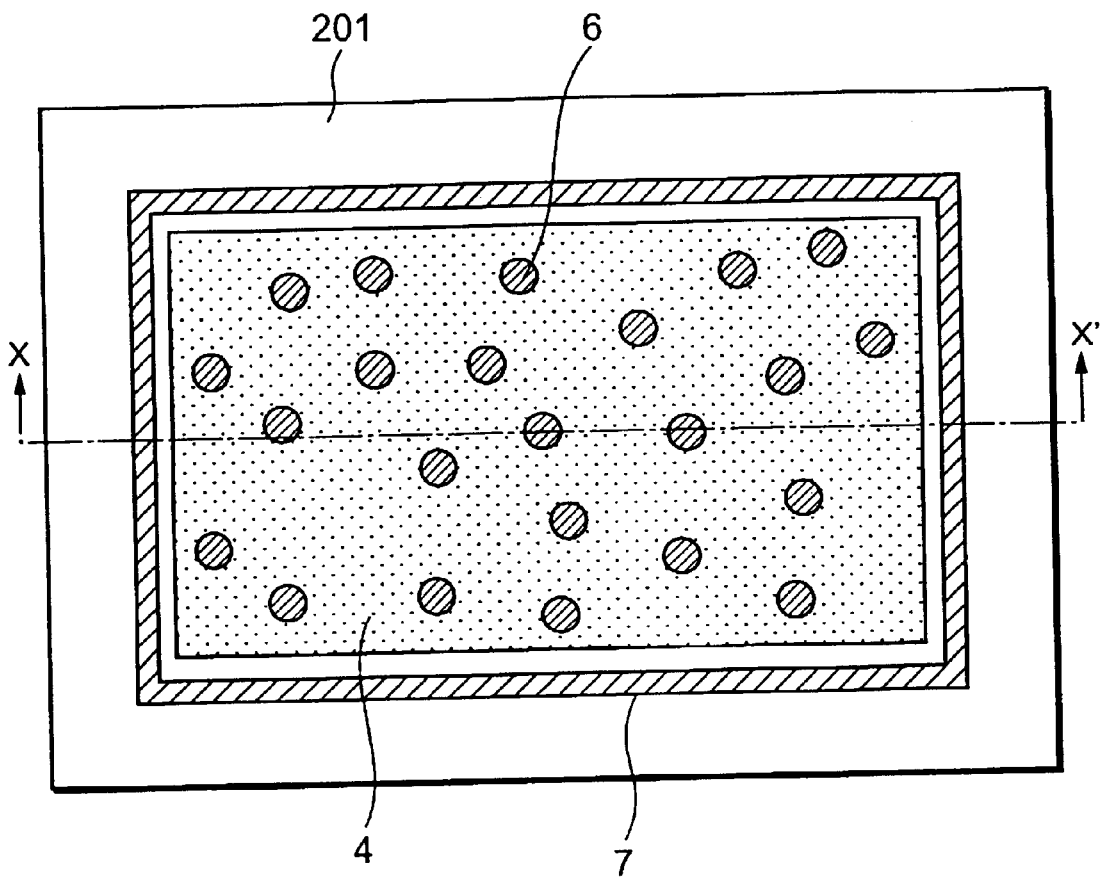
FIG. 11A is a plan view showing a bonding surface of the front substrate at which surface the rear substrate and the front substrate, those substrates constituting the LCD panel of the first embodiment, are bonded to each other.
Figure 11B:
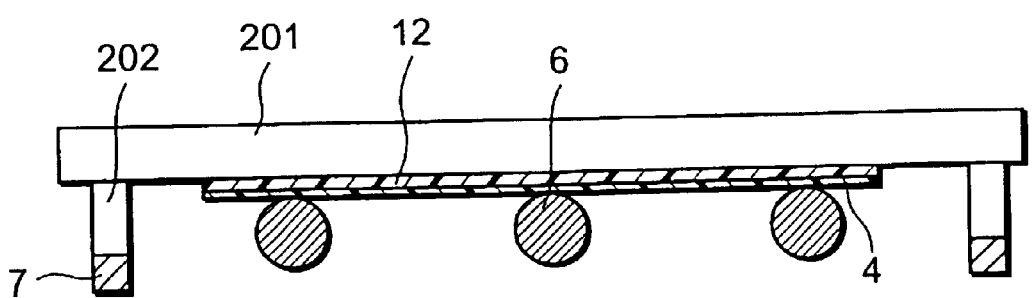
FIG. 11B is a cross-sectional view taken along a line X–X' of FIG. 11A.

As to the front substrate 201, after formation of the alignment layer, the spacers 6 whose diameter is a little bit smaller than the height of the partition wall 102 are dispersed (step S103). Subsequently, the sealing material 7 is provided on a tip end of the partition wall 202 (step S104). Either thermosetting resin or ultraviolet-curing resin may be used as the sealing material 7. FIGS. 11A and 11B show the front substrate 201 on which the partition wall 202, the color filter 12, the alignment layer 4, the spacers 6, and the sealing material 7 are provided.

As to the rear substrate 101, after formation of the alignment layer 4, the liquid crystal material 5 more than necessary is dropped on the side in which the liquid crystal outlet 3 is not located in the display region (for example, the left side in the case of FIGS. 10A and 10B) (step S105). FIGS. 10A and 10B show the rear substrate 101 in the state in which the partition wall 102, the alignment layer 4, and the liquid crystal material 5 are arranged.

Figure 12:
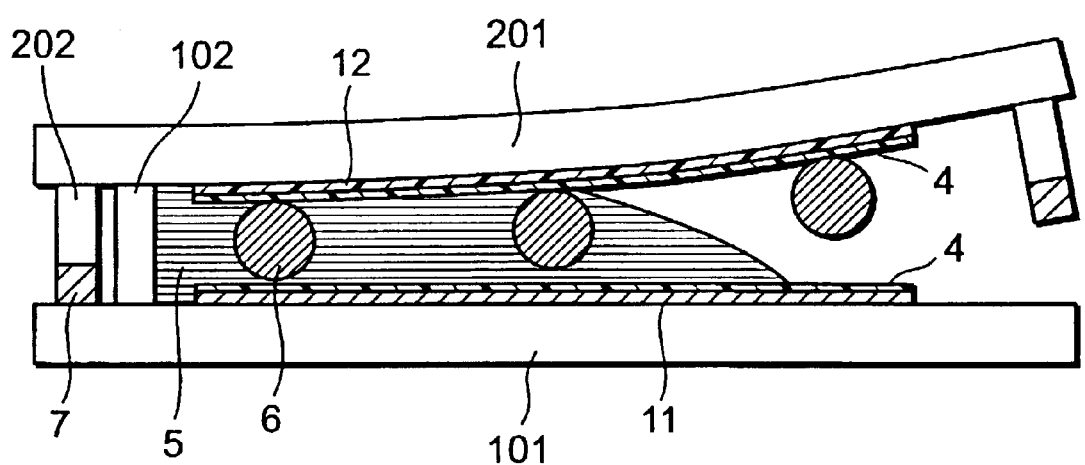
FIG. 12 is a diagram showing how the rear substrate and the front substrate are bonded to each other in accordance with the first embodiment.

As shown in FIG. 12, the rear substrate 101 and the front substrate 201 are gradually bonded to each other starting from the side on which the liquid crystal is disposed (that is, the side in which the liquid crystal outlet 3 is not disposed) in the atmospheric pressure while the excess liquid crystal material 5 is discharged from the liquid crystal outlet 3 (step S106) Thus, the liquid crystal material 5 is diffused over the display region due to surface tension. Then, when the rear substrate 101 and the front substrate 201 are completely bonded to each other, while the rear substrate 101 and the front substrate 201 are entirely subjected to uniform pressurization from the upper and lower sides, the sealing material 7 is hardened by heating the sealing material or exposing the same to ultraviolet rays (step S107).

In the LCD panel in accordance with this embodiment, since the liquid crystal material 5 does not directly contact the sealing material 7, the liquid crystal material 5 has lower potential to be in danger of contamination/deterioration in comparison with a case in which the liquid crystal material directly contacts the sealing material. Furthermore, decompression and sealing processes do not need to be performed, and an increase in the precision in the drop amount of the liquid crystal is not required. Therefore, the manufacturing process can be conducted at a higher speed, and in addition, the usage amount of the sealing material 7 can be reduced. Moreover, even when the liquid crystal material 5 leaks to the outside of the partition wall 102, it is stopped by the partition wall 202 and the sealing material 7. Thus, the liquid crystal material 5 never flows to the outside of the partition wall 202.

Second Embodiment

A description will be made of a second embodiment in which the present invention is suitably embodied.

Figure 13A:
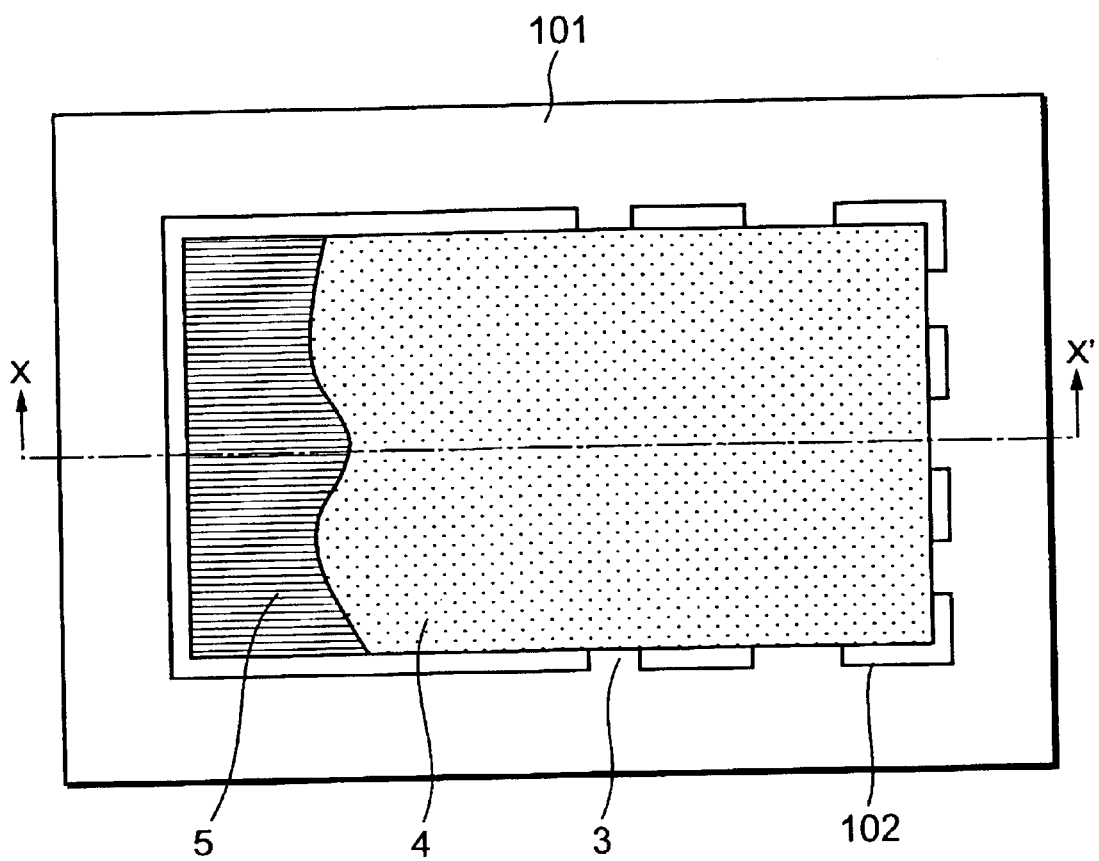
FIG. 13A is a plan view of a rear substrate that constitutes a LCD panel in accordance with a second embodiment of the present invention.
Figure 13B:
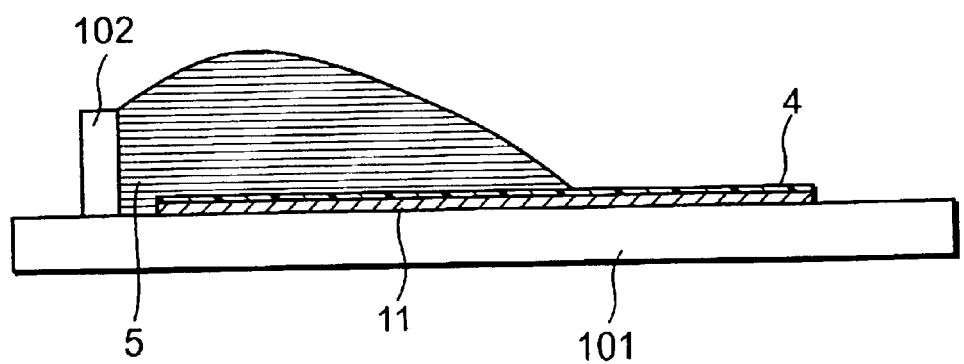
FIG. 13B is a cross-sectional view taken along a line X–X' of FIG. 13A.

A cross section of a LCD panel according to this embodiment has the same structure as that of the first embodiment shown in FIG. 8. Incidentally, as shown in FIGS. 13A and 13B, a plurality of liquid crystal outlets 3 are formed in the partition wall 102 in this embodiment. Note that FIG. 13A is a plan view of the rear substrate as a component of the LCD panel according to the second embodiment of the present invention, and FIG. 13B is a cross-sectional view taken along a line X–X' of FIG. 13A. Furthermore, a procedure of forming the liquid crystal panel in accordance with this embodiment is the same as that explained in the first embodiment in FIG. 9.

Figure 14:
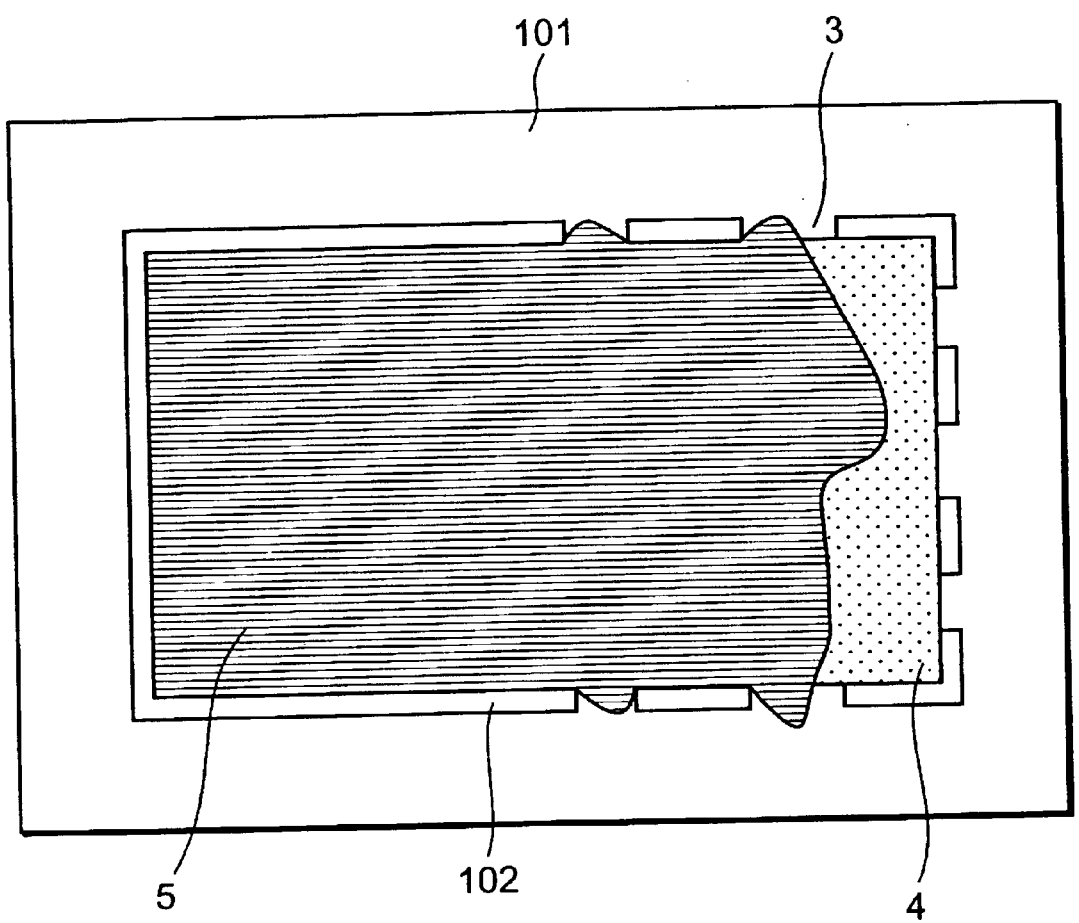
FIG. 14 is a diagram showing the geometric profile of a liquid crystal material on the rear substrate when bonding the rear substrate and a front substrate to each other in the second embodiment.

As is the case with the first embodiment (that is, as shown in FIG. 12), when the rear substrate 101 and the front substrate 201 are bonded to each other starting from the side on which the liquid crystal material 5 is disposed, the liquid crystal material 5 is diffused over the entire surface of the display region as shown in FIG. 14. In this embodiment, providing the plurality of liquid crystal outlets 3 allows the excess liquid crystal to promptly be discharged to the outside of the partition wall 102. Thus, the pressure applied to the corresponding portions that have been already bonded is reduced.

According to this embodiment, the bonding speed can be made higher, and also, the liquid crystal material 5 can be made difficult to leak to the outside of the partition wall 102. If the liquid crystal material 5 leaks to the outside of the partition wall 102, it is stopped by the partition wall 202 and the sealing material 7.

Note that the size and number of the liquid crystal outlets 3 may be appropriately changed in accordance with the conditions such as the material used for the liquid crystal material 5 and the cell gap between the rear substrate 101 and the front substrate 201. For example, in the case where the liquid crystal material 5 has a small viscosity, it is preferable to make the outlet 3 large and to make the number of the outlets 3 to be arranged small. On the other hand, in the case where the liquid crystal material 5 has a large viscosity, it is preferable to make the outlet 3 small and to make the number of the outlets 3 to be arranged large. Note that in the LCD panel according to this embodiment, not all the outlets 3 necessarily need to have the same size, and the outlets 3 having different sizes may be provided.

Third Embodiment

Figure 15:
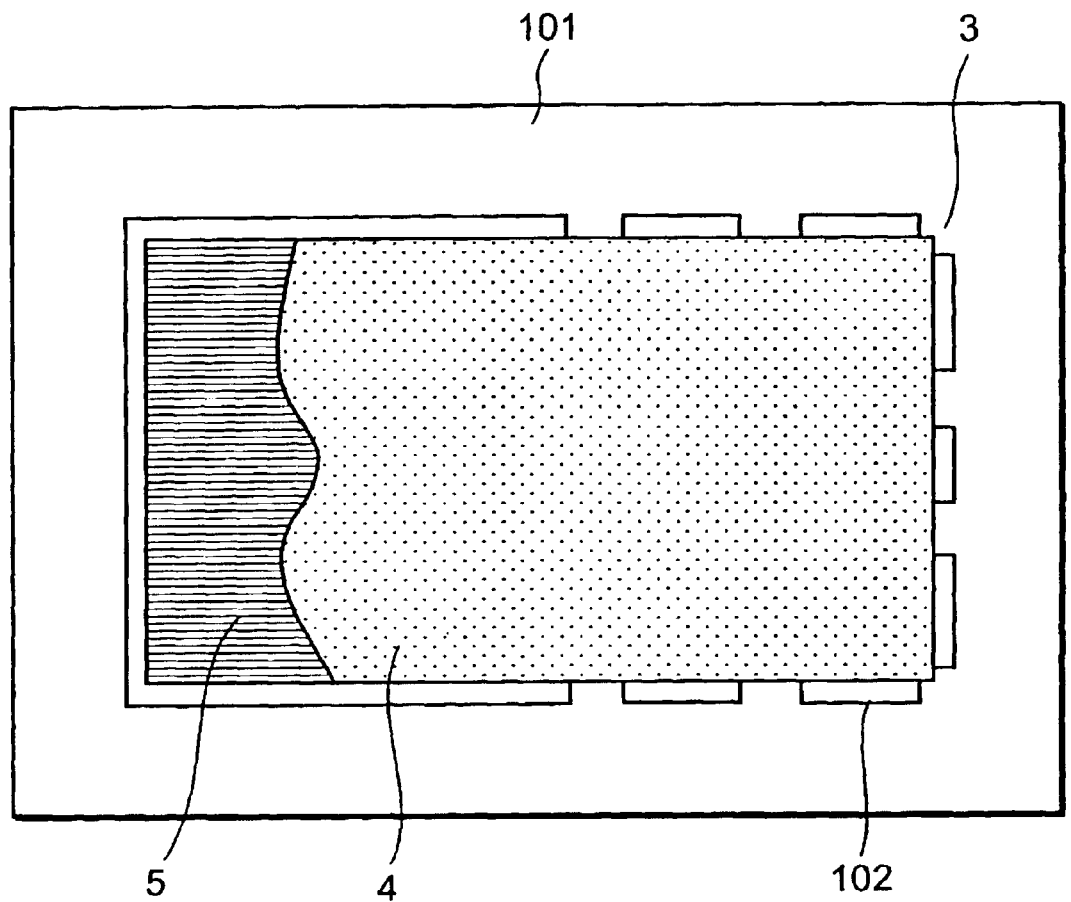
FIG. 15 is a plan view of a rear substrate that constitutes a LCD panel in accordance with a third embodiment of the present invention.

A description will be made of a third embodiment in which the present invention is suitably embodied. An LCD panel according to this embodiment has the same structure as that of the first embodiment shown in FIG. 8. Incidentally, as shown in FIG. 15, some of the liquid crystal outlets 3 are provided at corner portions of the display region of the rear substrate 101 in this embodiment. Furthermore, a procedure of forming the LCD panel in accordance with this embodiment is the same as that described in the first embodiment referring to FIG. 9.

Figure 16:
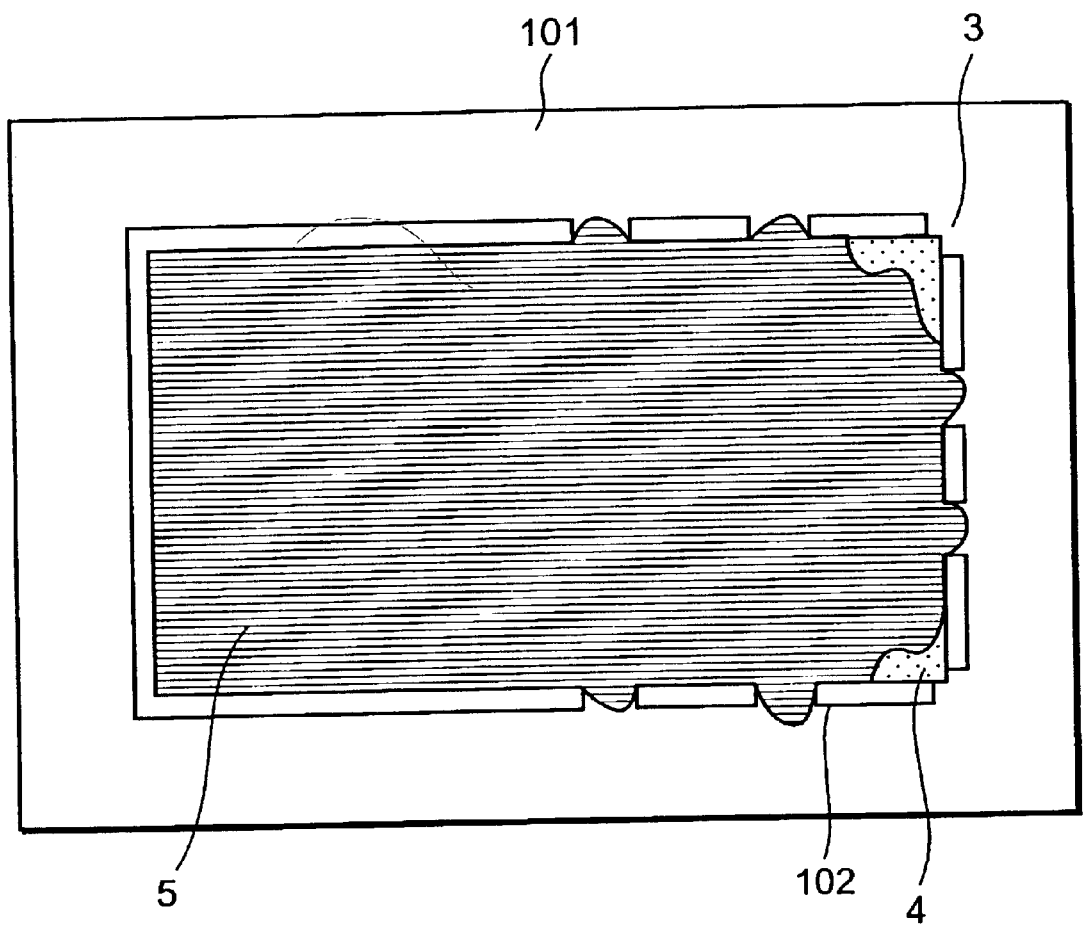
FIG. 16 is a diagram showing the geometric profile of a liquid crystal material on the rear substrate when bonding the rear substrate and a front substrate in the third embodiment.

As is the case with the first embodiment (that is, as shown in FIG. 12), when the rear substrate 101 and the front substrate 201 are bonded to each other starting from the side on which the liquid crystal material 5 is disposed, the liquid crystal material 5 is diffused over the entire surface of the display region as shown in FIG. 16. In this embodiment, some of the liquid crystal outlets 3 are provided at the corner portions of the display region, and thus, the liquid crystal material 5 speedily diffuses without the residue of air at those portions.

According to this embodiment, since the air in the display region is promptly exhausted, the manufacturing process can be conducted at a higher speed.

It should be appreciated that although the above-mentioned embodiments assume the case in which a common electrode resides on a front substrate, the present invention is not limited to those embodiments, but may employ the case in which a common electrode is formed on a rear substrate together with a pixel electrode to constitute electrodes for generating a lateral electric field in a so-called lateral electric field LCD device.

Note that the respective embodiments are examples of the preferred embodiments of the present invention. The present invention is not limited to this, and various modifications can be made.

For example, the partition walls 102 and 202 may be respectively provided on the substrates different from the corresponding substrates indicated in the embodiments. That is, it may be such that the partition wall 202 is provided on the rear substrate 101 and the partition wall 102 is provided on the front substrate 201. In this case, after the liquid crystal material 5 is dropped onto the front substrate 201, the rear substrate 101 and the front substrate 201 are bonded to each other.

Furthermore, in the respective embodiments, although the spacer 6 is dispersed to the front substrate 201, it may be dispersed on the rear substrate 101.

Moreover, the number and position of the liquid crystal outlets 3 are not limited to those in the drawings, and may be appropriately changed.

As apparent from the above description, according to the present invention, the quality of the LCD panel can be improved, and the operation time span in the manufacturing process of the LCD panel can be shortened.

What is claimed is:

1. A liquid crystal display panel comprising:
    a liquid crystal layer sandwiched between a first substrate and a second substrate;
    a first partition wall formed on said first substrate for defining a display region by surrounding said liquid crystal layer, said first partition wall being provided with at least one opening to allow an overflow of an excess liquid crystal;
    a second partition wall formed lower than said first partition wall on said second substrate so as to surround said first partition wall and forming a gap between said first substrate and said second partition wall; and
    a sealing member provided on said second partition wall so as to seal said gap between said first substrate and said second partition wall.

2. The liquid crystal display panel according to claim 1, wherein said first partition wall is provided with a plurality of openings to allow an overflow of an excess liquid crystal from said display region to outside region thereof.

3. The liquid crystal display panel according to claim 2, wherein said plurality of openings are located on a half side of said display region.

4. The liquid crystal display panel according to claim 1, further comprising spacer particles dispersed in said liquid crystal layer.

5. A method for manufacturing a liquid crystal display panel comprising:

forming a first partition wall on a first substrate for defining a display region, said first partition wall being provided with at least one opening;

forming a second partition wall on a second substrate so as to surround said first partition wall, said second partition wall being lower than said first partition wall to form a gap between said first substrate and said second partition wall;

providing a sealing member on said second partition wall so as to seal said gap between said first substrate and said second partition wall;

dropping liquid crystal onto a portion of said display region of said first substrate within said first partition wall, said portion being remote from said at least one opening of said first partition wall;

bonding said first substrate and said second substrate while discharging a surplus liquid crystal from said at least one opening; and hardening said sealing material while pressurizing over said first substrate and said second substrate.

6. The method for manufacturing a liquid crystal display panel according to claim 5, wherein said at least one opening constitutes a plurality of openings and in said forming of said first partition wall, at least one of said plurality of liquid crystal outlets is provided in the vicinity of a corner of said display region of said first substrate.

7. The method for manufacturing a liquid crystal display panel according to claim 5, wherein, in said forming of said first and second partition walls, said first and second partition walls are formed by a photoetching method.

* * * * *